March 12, 1957 J. J. RANDO 2,784,793
COMBINATION VEHICLE JACK AND PARKING DEVICE
Filed June 27, 1955 2 Sheets-Sheet 1
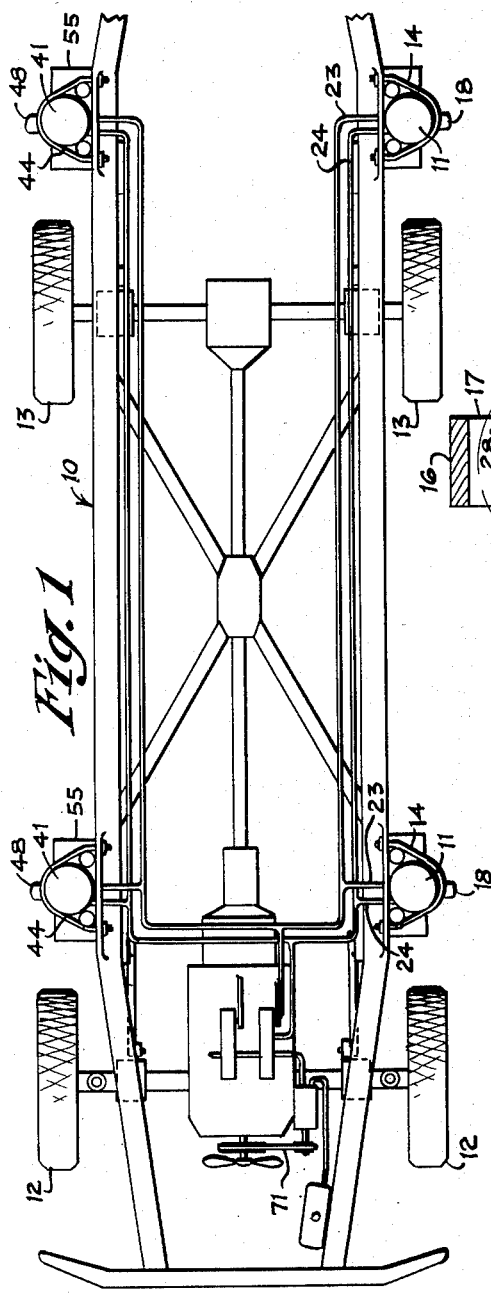
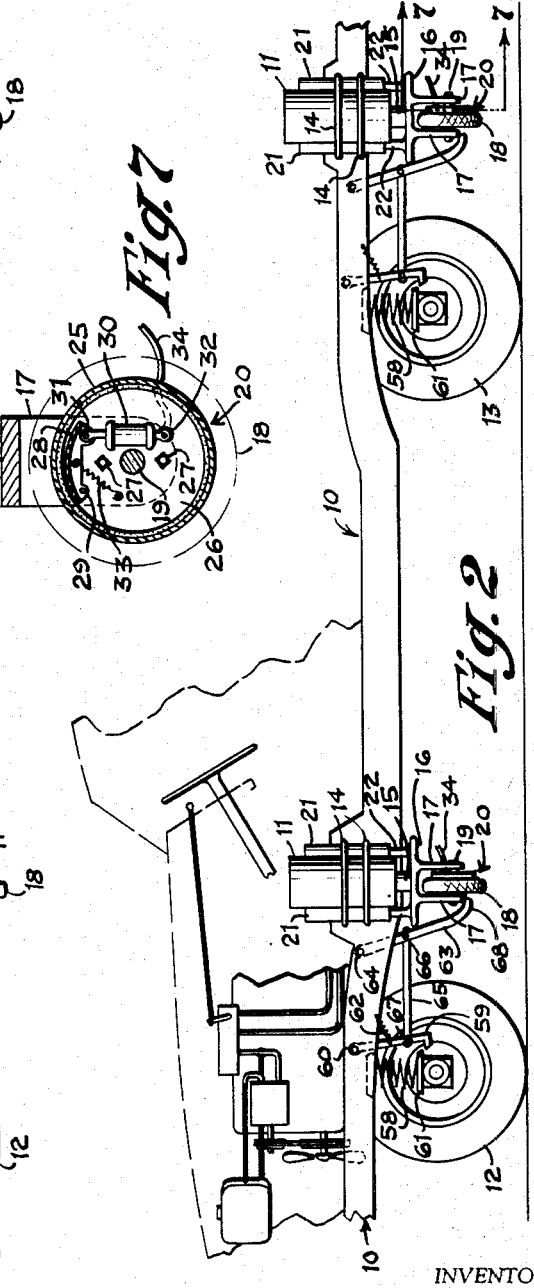
INVENTOR
JAMES J. RANDO
BY *Kimmel & Crowell*
ATTORNEYS March 12, 1957
J. J. RANDO
2,784,793
COMBINATION VEHICLE JACK AND PARKING DEVICE
Filed June 27, 1955
2 Sheets-Sheet 2
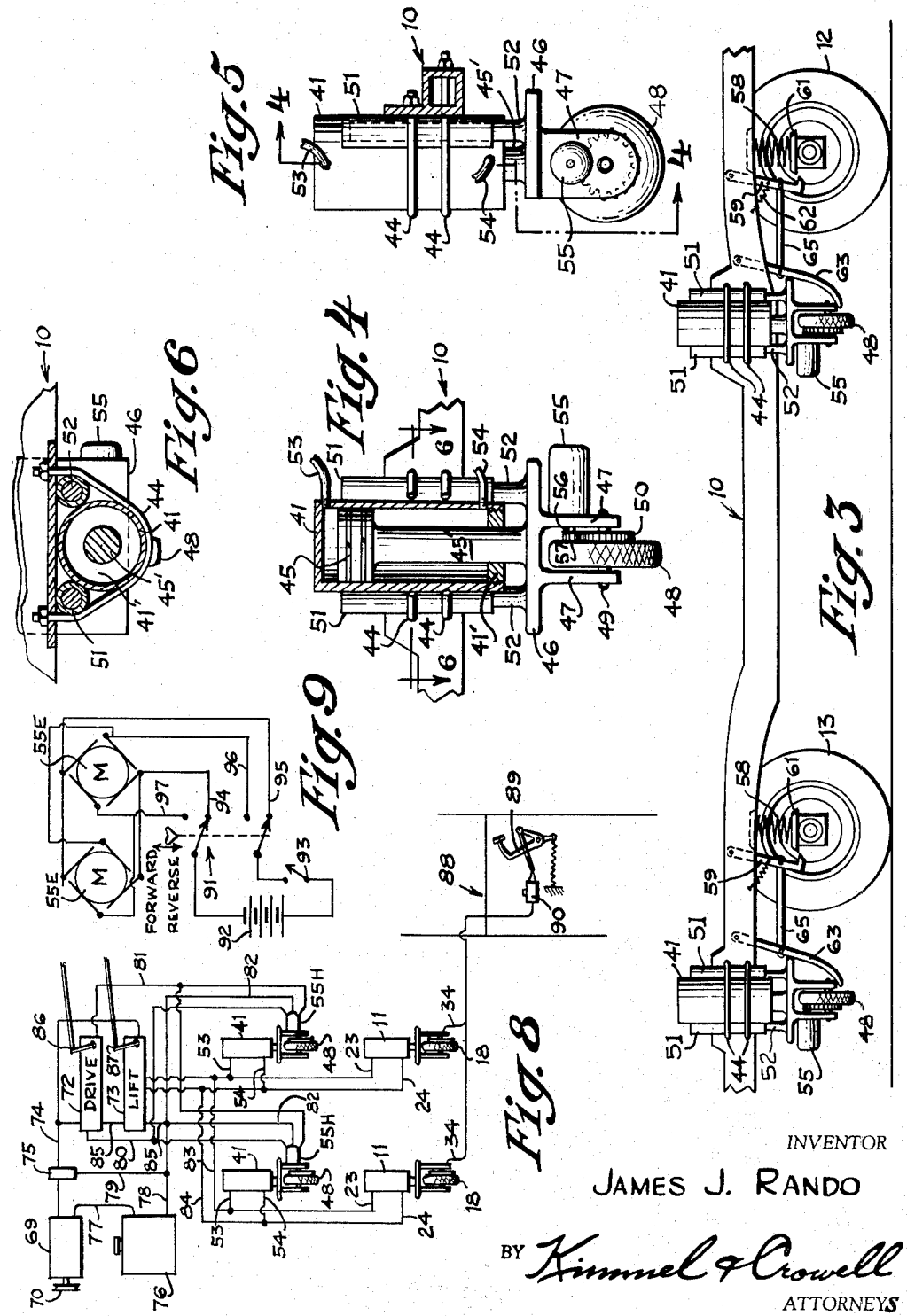
INVENTOR
JAMES J. RANDO
BY Kimmel & Crowell
ATTORNEYS

United States Patent Office 2,784,793
Patented Mar. 12, 1957

2,784,793

COMBINATION VEHICLE JACK AND PARKING DEVICE

James J. Rando, Atlantic City, N. J.

Application June 27, 1955, Serial No. 518,045

1 Claim. (Cl. 180—1)

The present invention relates to a combination vehicle jack and parking device, and more particularly to a parking device adapted to lift the wheels of the vehicle completely from the ground and move the vehicle sideways to the desired point.

The instant invention is an improvement on applicant's device entitled "Vehicle Parking Means," upon which U. S. Patent No. 2,692,143 issued on October 19, 1954.

The primary object of the invention is to provide a lift type parking device having both power driven wheels for moving the vehicle and separate brakeable wheels for stopping the vehicle on the completion of its sidewise movement.

A further object of the invention is to provide a structure of the class described with automatically actuated spring locks for preventing spring sag during the lifting and moving operation.

A still further object of the invention is to provide in a device of the class described positive drive means for rotating at least one of the lifting wheels.

Other objects and advantages will become apparent in the following specification when read in the light of the attached drawings, in which:

Figure 1 is a top plan view of the invention shown attached to a vehicle having parts thereof broken away.

Figure 2 is a left side elevation of the vehicle with the invention shown attached thereto with parts broken away.

Figure 3 is a right side elevation of the vehicle with the invention shown attached thereto with parts broken away.

Figure 4 is a vertical cross-section of one of the units taken on the line 4—4 of Figure 5, looking in the direction of the arrows.

Figure 5 is a side elevation of one of the devices shown attached to the vehicle frame.

Figure 6 is a transverse section of one of the devices taken on the line 6—6 of Figure 4, looking in the direction of the arrows.

Figure 7 is an enlarged vertical cross-section of one of the devices taken on the line 7—7 of Figure 2, looking in the direction of the arrows.

Figure 8 is a diagrammatic showing of the hydraulic system for conducting fluid to the several hydraulic motors.

Figure 9 is a diagrammatic circuit showing the electric flow when electric motors are used.

Now referring to the drawings in detail wherein like reference numerals indicate like parts throughout the several figures, the reference numeral 10 indicates, generally, the frame of a motor vehicle to which the invention is to be attached. A pair of hydraulic cylinders 11 are attached to the frame 10 on the left side of the vehicle with one of the cylinders 11 positioned to the rear of the front wheels 12 and the other of the cylinders 11 positioned to the rear of the rear wheels 13.

A pair of U-bolts 14 surround the cylinders 11 and pass through the frame 10 to clamp the cylinders 11 to the frame 10. A piston (not shown) is mounted for reciprocation in the hydraulic cylinder 11. While the piston in the hydraulic cylinder 11 is not shown it is, however, identical to the piston shown in Figure 4. A piston rod 15 is attached to the piston within the cylinder 11 and extends through the bottom thereof.

A plate 16 is secured to the bottom of the piston rod 15 and extends a substantial distance laterally therefrom. A pair of depending arms 17 extend downwardly from the plate 16 forming a fork to receive a wheel 18 therebetween. The wheel 18 is pivoted to the arms 17 by means of an axle 19 passed therethrough. A brake mechanism 20 is secured to the side of the wheel 18 and will be more completely described hereafter.

The cylinder 11 has a pair of guide cylinders 21 secured to the side thereof with the axis of the cylinders 21 parallel to the axis of the cylinders 11. A pair of guide rods 22 are secured to the plate 16 and extend upwardly therefrom into the guide cylinders 21 and are adapted to reciprocate therein simultaneously with the reciprocation of the piston rod 15 in the cylinders 11. The guide rods 22 and the guide cylinders 21 serve to prevent the rotation on a vertical axis of the piston rod 15 and its dependent members.

A hydraulic line 23 is connected to the top of the cylinder 11 and a second hydraulic line 24 is connected to the bottom of the cylinder 11 so that when these lines 23 and 24 are connected to the hydraulic system, the piston within the cylinder 11 can be caused to reciprocate therein thus lowering and raising the wheel 18.

The brake mechanism 20, as is particularly shown in Figure 7, includes a brake drum 25 secured to the wheel 18 and has a backing plate 26 secured to the arm 17 by means of bolts and nuts 27. A brake shoe 28 is pivoted to the backing plate at 29 at one end thereof and has its opposite end moved by a hydraulic servomotor 30 connected at 31 to the brake shoe and at 32 to the backing plate.

A spring 33 extends between the backing plate 26 and the brake shoe 28 serves to maintain the brake shoe 28 out of contact with the brake drum 25 when no pressure is applied to the servomotor 30. A hydraulic brake line 34 is connected at one end to the servomotor 30 and at the other end to the conventional hydraulic brake system of the vehicle in a manner to be later described.

A pair of hydraulic cylinders 41 are positioned on the right side of the vehicle with one of the cylinders 41 being to the rear of the front wheel 12 and the other cylinder 41 being to the rear of the rear wheel 13. The cylinders 41 are secured to the frame 10 by means of a pair of U-bolts 44 surrounding the cylinders 41 and passing through the frame.

A piston 45 is positioned within the cylinder 41 and has connected thereto a piston rod 45'. The piston rod 45' passes through the bottom wall 41' of the cylinder 41 and has attached to the bottom thereof a transversely extending plate 46. A pair of depending arms 47 extend downwardly from the plate 46 in generally parallel relation to each other. A wheel 48 is positioned between the arms 47 and is pivoted therebetween on an axle 49. A gear 50 is secured to the wheel 48 and rotates therewith.

A pair of guide cylinders 51 are secured to the sides of the cylinder 41 with the axis of the cylinders 51 parallel to the axis of the cylinder 41. A pair of guide rods 52 are secured to the plate 46 and extend upwardly therefrom into the cylinders 51. The guide rods 52 reciprocate in the cylinders 51 simultaneously with the reciprocation of the piston 45 in the cylinder 41 so that the piston rod 45' is maintained against rotation on a vertical axis. A hydraulic line 53 is connected to the top of the cylinder 41 and a second hydraulic line 54 is connected to the bottom of the cylinder 41 with the opposite ends of the lines 53 and 54 connected into a hydraulic circuit in a manner to be later described.

A motor 55 which may be either hydraulically or electrically driven is secured to one of the depending arms 47 and has a shaft 56 extending through the arm 47 carrying a gear 57 on the outer end thereof. The gear 57 is meshed with the gear 50 on the wheel 48 so that rotation of the motor 55 will rotate the wheel 48.

The vehicle wheels 12 and 13 are supported on springs 58 which, upon lifting of the frame 10, would normally sag and permit the wheels 12 and 13 to remain on the ground until the springs 58 have become fully extended thus requiring a substantially greater lift from the cylinders 11 and 41 before the wheels 12 and 13 leave the ground. To prevent the springs 58 from sagging each wheel 12 and 13 is provided with adjacent spring retaining hooks 59 pivoted to the frame 10 at 60. The spring retaining hook 59 is adapted to engage under the movable spring saddle 61 at the lower end of the spring 58 to prevent the spring 58 from expanding. The spring retainer hook 59 is normally maintained out of engagement with the spring saddle 61 by means of a spring 62 extending between the frame 10 and the spring retainer hook 59.

A plate engaging cam bar 63 is likewise pivoted to the frame at 64 and is connected by a lever 65 pivoted at one end to the cam bar 63 at 66, and at the other end to the spring retaining hook 59 at 67. The cam bar 63 engages the plate 16 of the cylinders 11 or the plate 46 of the cylinders 51 and is moved by the downward movement of the plates 16 or 46 so as to move the hook 59 into engagement with the spring saddle 61 thus locking the spring 58 against expansion. The lower end of the cam bar 63 is provided with a hook 68 which engages under the bottom end of either the arm 17 or 47 to maintain the wheels 18 or 48 in retracted position when no pressure is applied to their respective cylinders 11 and 41. The engagement of the hook 68 with the arms 17 or 47 prevents the accidental dropping of the wheels 18 and 48 when the vehicle is in normal operation.

Referring now in detail to Figure 8 wherein the hydraulic system is disclosed, it should be understood that this showing is diagrammatic and the single lines extending between the several elements indicate hydraulic pipe lines.

A hydraulic pump 69 is driven by a pulley 70 connected to the fan belt 71 of the vehicle. A pair of control valves 72 and 73 are positioned adjacent the hydraulic pump 69 and are connected thereto by means of a pressure line 74. A high pressure relief valve 75 is positioned in the line 74. A reservoir 76 provides hydraulic fluid for the pump 69 through line 77 and receives the returned hydraulic fluid through line 78. A by-pass line 79 connects the high pressure relief valve 75 with the return line 78. Hydraulic motors 55H are secured in driving relation to the wheels 48 supported under the cylinders 41.

A line 80 connects one side of the hydraulic motors 55H with one side of the control valve 72, and a line 81 connects the other side of the hydraulic motors 55H with the other side of the control valve 72. A return line 82 extends from the return of the hydraulic motors 55H to the return line 78 leading to the reservoir 76. A line 83 extends from one side of the control valve 73 to the lines 23 and 53 extending from the top of the cylinders 11 and 41, respectively, and a line 84 extends from the other side of the control valve 73 to the lines 24 and 54 extending to the bottom of the cylinders 11 and 41, respective. A by-pass line 85 extends between the control valves 72 and 73 and to the return line 78.

It should be noted that both of the control valves 72, 73 have three positions controlled by their control handles 86 and 87, respectively. The three positions direct fluid in the case of the control valve 72 to drive the hydraulic motors 55H in forward or reverse direction and to by-pass. The three positions of the control valve 73 direct the hydraulic pressure to the top of the cylinders 11 and 41, to the bottom of the cylinders 11 and 41 or to by-pass. Thus it can be seen that the wheels 18 and 48 can be moved downwardly and upwardly as desired to raise or lower the vehicle.

The brake lines 34 extending from the brake mechanism 20 are connected to the hydraulic brake system of the vehicle generally indicated at 88. The brake system 20 will be operated upon pressure being exerted on the brake pedal 89 actuating the master cylinder 90 in the usual manner.

Referring now to Figure 9 there is disclosed the electric circuit used when electric motors 55E are secured to the wheels 48 in place of the hydraulic motors 55H. A forward and reverse switch 91 is connected to a battery 92 and through a cut off switch 93 so as to furnish electricity to electric lines 94 and 95 extending to the motors 55E in a manner to drive the motors in one direction, and upon movement of the switch 91 electricity is directed through the lines 96 and 97 to the motors 55E in a manner to cause the motors to operate in the other direction. It should be understood that the electric motors 55E are of a conventional nature.

In the use and operation of the invention, the driver of the motor vehicle stops the vehicle adjacent a parking place slightly longer than the total length of the vehicle. Then by actuation of the control valve 73 the hydraulic cylinders 11 and 41 are energized and the vehicle is lifted from the ground at all four corners. The motors 55 are then energized by either electric or hydraulic means rotating the wheels 48 thus moving the vehicle side-ways into the parking spot.

When the vehicle has moved a sufficient distance, the brake mechanism 20 is actuated by pressing the conventional brake pedal 89 which stops the movement of the wheels 18 thus stopping the vehicle at the desired point. The control valve 73 is then moved to reverse position lowering the vehicle to the ground in the parking spot. The reverse procedure is followed in moving the vehicle from a parking spot, except that the motors 55 are driven in the reverse direction. It should be noted that the hooks 59 prevent the wheels 12 and 13 from sagging on their springs 58 as the vehicle is lifted.

Having described the preferred embodiments of the invention, it should be understood that various modifications and structural adaptations may be resorted to without departing from the scope of the appended claim.

What is claimed is:

A combination vehicle jack and parking device comprising a pair of vertically disposed hydraulic cylinders attached at the front end and rear end of one side of a vehicle, a second pair of vertically disposed hydraulic cylinders attached at the front end and rear end of the other side of the vehicle, a piston mounted for vertical reciprocation in each of said cylinders, a wheel positioned below each of said cylinders, means connecting each of said wheels to its respective piston, means on said cylinders cooperating with means on said connecting means for aligning said wheels with said cylinders, power means on each wheel on one side of said vehicle rotating said wheel, means including a cam for clamping the vehicle springs against expansion, means on said connecting means for actuating said cam whereby said spring clamping means is caused to move into spring clamping position, a brake mounted on each of said wheels opposite said power driven wheels, and means associated with the brake system of the vehicle for actuating said brakes for arresting the rotation of said wheels.

References Cited in the file of this patent

UNITED STATES PATENTS

| | | |
|---|---|---|
| 1,374,044 | Valeur | Apr. 5, 1921 |
| 1,565,134 | Williams et al. | Dec. 8, 1925 |
| 1,742,636 | Collins | Jan. 7, 1930 |
| 2,692,143 | Rando | Oct. 19, 1954 |